United States Patent
Pettersson

(10) Patent No.: US 9,103,686 B2
(45) Date of Patent: Aug. 11, 2015

(54) METHOD AND GUIDANCE-UNIT FOR GUIDING BATTERY-OPERATED TRANSPORTATION MEANS TO RECONDITIONING STATIONS

(75) Inventor: Bo Pettersson, London (GB)

(73) Assignee: LEICA GEOSYSTEMS AG, Heerbrugg (CH)

( * ) Notice: Subject to any disclaimer, the term of this patent is extended or adjusted under 35 U.S.C. 154(b) by 56 days.

(21) Appl. No.: 13/639,449

(22) PCT Filed: Apr. 27, 2011

(86) PCT No.: PCT/EP2011/056688
§ 371 (c)(1),
(2), (4) Date: Oct. 9, 2012

(87) PCT Pub. No.: WO2011/138205
PCT Pub. Date: Nov. 10, 2011

(65) Prior Publication Data
US 2013/0046457 A1   Feb. 21, 2013

(30) Foreign Application Priority Data
May 6, 2010   (EP) ..................................... 10162188

(51) Int. Cl.
*G01C 21/34*   (2006.01)
*B60L 1/00*   (2006.01)
(Continued)

(52) U.S. Cl.
CPC ................. *G01C 21/34* (2013.01); *B60L 1/003* (2013.01); *B60L 1/02* (2013.01); *B60L 1/14* (2013.01);
(Continued)

(58) Field of Classification Search
CPC .......... G08G 1/0104; G08G 1/096716; G08G 1/096775; G08G 1/096741; G08G 1/20

USPC ............ 701/70, 54, 538, 533, 532, 439, 409, 701/33.7, 31.9, 31.4; 340/901, 457.1, 340/425.5; 320/101, 110, 116; 705/7.14, 705/7.13, 39, 34
See application file for complete search history.

(56) References Cited

U.S. PATENT DOCUMENTS 5,487,002 A   1/1996   Diller et al.
5,790,976 A   8/1998   Wolf et al.
(Continued)

FOREIGN PATENT DOCUMENTS

DE   10 2008 017556 A1   10/2008
JP   10-012802 A   1/1998
(Continued)

OTHER PUBLICATIONS

European Search Report dated Oct. 11, 2010 as received in application No. EP 10 16 2188.
Kevin Bullis, "Liquid Battery" Technology review, Published by MIT, No. 10, Mar./Apr. 2009.

*Primary Examiner* — Helal A Algahaim
*Assistant Examiner* — Jelani Smith
(74) *Attorney, Agent, or Firm* — Maschoff Brennan

(57) ABSTRACT

Methods and apparatus for guiding a mobile transportation means of a set of transportation means to a selected reconditioning station of a set of reconditioning stations, comprising determining a position of the battery, determining a condition of the battery, forecasting a consumption characteristic of the transportation means, evaluating an achievable range of mobility of the transportation means, assigning the selected reconditioning station of the set of reconditioning stations, which is located within the range of mobility of the transportation means along a path to a desired target and guiding the transportation means to the selected reconditioning station, an optimization of the assignment and/or the path is executed by a search algorithm for assigning the set of transportation means to the set of reconditioning stations and batteries, based on actual and/or forecasted information about multiple entities of the sets of transportation means, stations and batteries as well as their conditions.

16 Claims, 7 Drawing Sheets

(51) Int. Cl.
*B60L 1/02* (2006.01)
*B60L 1/14* (2006.01)
*B60L 8/00* (2006.01)
*B60L 11/18* (2006.01)

(52) U.S. Cl.
CPC ............ *B60L 8/003* (2013.01); *B60L 11/1857* (2013.01); *B60L 11/1861* (2013.01); *G01C 21/3469* (2013.01); *B60L 2200/12* (2013.01); *B60L 2200/18* (2013.01); *B60L 2200/40* (2013.01); *B60L 2200/46* (2013.01); *B60L 2240/545* (2013.01); *B60L 2240/622* (2013.01); *B60L 2240/66* (2013.01); *B60L 2250/16* (2013.01); *Y02T 10/7005* (2013.01); *Y02T 10/705* (2013.01); *Y02T 10/7044* (2013.01); *Y02T 10/7083* (2013.01); *Y02T 10/7291* (2013.01); *Y02T 90/16* (2013.01); *Y02T 90/161* (2013.01); *Y02T 90/162* (2013.01)

(56) References Cited

U.S. PATENT DOCUMENTS

| | | |
|---|---|---|
| 6,005,494 A | 12/1999 | Schramm |
| 8,229,611 B2 | 7/2012 | Yamada |
| 2007/0154814 A1 | 7/2007 | Ryu et al. |
| 2007/0159177 A1* | 7/2007 | Bertness et al. ............. 324/426 |
| 2011/0270476 A1 | 11/2011 | Doppler et al. |
| 2012/0022904 A1* | 1/2012 | Mason et al. ............... 705/7.13 |
| 2012/0098676 A1* | 4/2012 | Oizumi et al. ............... 340/901 |
| 2012/0158229 A1* | 6/2012 | Schaefer ........................ 701/22 |

FOREIGN PATENT DOCUMENTS

| | | |
|---|---|---|
| JP | 10-170293 A | 6/1998 |
| JP | 2006-112932 A | 4/2006 |
| JP | 2006-115623 A | 4/2006 |
| JP | 2006-331405 A | 12/2006 |
| WO | 2009/039454 A | 3/2009 |
| WO | 2010003711 A1 | 1/2010 |

* cited by examiner

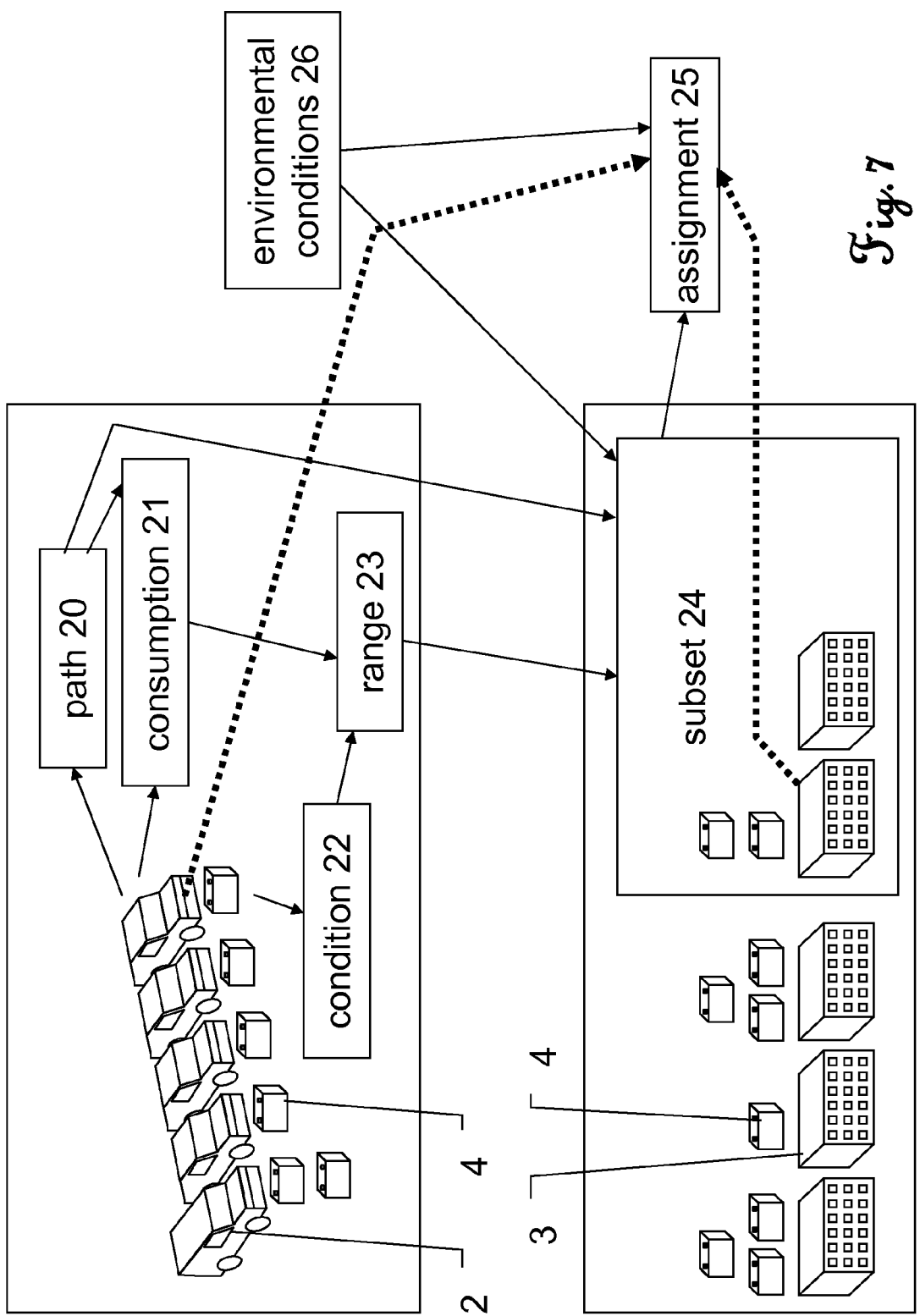

METHOD AND GUIDANCE-UNIT FOR GUIDING BATTERY-OPERATED TRANSPORTATION MEANS TO RECONDITIONING STATIONS

FIELD OF THE INVENTION

The present invention relates generally to a method for guiding transportation means with batteries to reconditioning stations, a guidance-unit for the execution of the claimed methods, and a computer program product.

BACKGROUND

The expected shortage of fossil fuels, ecological problems, climate concerns and resulting pollution restrictions are likely to increase the demand for electrically powered transportation means, further also referred to as vehicles, in the near future.

In contrast to the existing and well functioning petrol supply system, new challenges will advance out of this, since in contrast to petrol tanks, the storages for electrical energy, further also referred to by the common terms energy cell, battery or accumulator, are expensive, have a limited lifetime and require careful handling. Especially in the present state of development, in particular much longer time is needed for the regeneration of such a storage than for the refilling of a fuel tank of similar energy content. Another important drawback is the limited range, achievable with battery powered vehicles as the stored energy per weight ratio of such storages is much lower than the one of fossil fuel, whereby a desired low weight of the accumulators does result in a limited range of activity of such a vehicle which can be overcome without regeneration or exchange of the storage.

The vehicles can be expected to be dominated by wheelers comparable to the presently used passenger cars, but also other transportation means such as lorries, trucks, tractors, public buses, scooters, motorcycles, electrically powered bikes, crates, coaches or even construction machineries can in the future be equipped with electrical propulsions and therefore the herein described method and unit is also applicable on those.

To manage the consumption of energy and range of mobility of the vehicles many, more or less sophisticated, methods and means that can be implemented into the vehicles are known in the prior art. Many of them involve the task of vehicle navigation similar to the navigation devices as included in fuel powered vehicles.

The words storage, battery or energy cell represent means, which are movable and capable of supplying electrical energy. This comprises advanced technologies such as liquid batteries as e.g. presented in US 2007/0154814, energy cells which are rechargeable by exchange of electrolytes or liquid electrodes e.g. similar to the "liquid battery" presented in MIT's technology review magazine, No. 10, March/April 2009.

The storages can in general be primary cells as well as secondary cells, which signify that they do not necessarily need to be rechargeable or regeneratable. They can as well just be exchangeable, replaceable or even consumable just once, with their remains disposable after usage. Therefore, the words storage, battery, energy cell, and accumulator are used in a synonymous way to describe those means.

The document JP 10170293 concerns the search of an optimum leading route to the destination, by considering the charge of an on-vehicle battery on the basis of road map data which contains information on charging stations. A GPS receiver receives a GPS signal from a satellite and detects the present position, moving direction and moving velocity of the vehicle. A memory stores road map data which includes information on the charging station such as its position and a residual capacity of an on-vehicle battery is measured. A controller searches an optimum leading route to the destination and displays the present position and the leading route on a road map to guide a driver.

From the Japanese patent application JP 2006112932, a navigation system for an electric vehicle which can perform total time forecasting to a destination, including the charging time for a vehicle-mounted battery, is known. In addition, the system is also capable of providing information on restaurant locations, tourist spots, leisure facilities, or the like in the vicinity of charging facilities. This is done by the navigation system for the electric vehicle which comprises a display, an input section, a battery management section for measuring a remaining amount of the vehicle-mounted battery and a database section which stores position, information on charging performance and map information of the charging facilities.

An analysis section calculates charging time at the charging facility on the basis of the remaining amount of the vehicle-mounted battery, the energy consumption of the electric vehicle, the distance from the present position to the charging facility and the distance from the charging facility to the destination. The time of arrival at the destination, including the charging time calculated by the analysis section, is displayed on the display section.

The document JP 1012802 discloses a system to prevent a battery-driven vehicle from stopping due to the consumption of the remaining capacity of a battery during travelling by an alternation of the destination to a charging position, when the battery voltage arrives at a predetermined value. Therein a separate distance between the present travelling position of the battery-driven vehicle and a charging position for charging the battery is detected and a battery voltage allowable value according to the separate distance signals is set. On the other hand, when the fact is detected that the remaining capacity of the battery arrives at a predetermined battery voltage allowable value, the designation is altered to a position instructed by a destination setter and a travel controller outputs a command for the vehicle to travel to the charging position.

The therein presented method of changing the target of travel to a charging location when the battery level drops below a certain threshold might be acceptable if the recharging of the energy storage can be done within short time or the vehicle is of a kind such as an autonomous electrical lawn mower, but it is not desirable for personal transportation and time consuming regeneration or charging processes, since the unpredictability of the system and the thereof resulting unknown time of travel and stopovers would for sure not be accepted by a driver in many cases.

The publication DE 10 2008 017556 presents a navigation unit of a hydrid vehicle which records a charge-possible point and the history of travelling conditions near the charge-possible point. If a destination point on an optimum route is the charge-possible point, the navigation unit determines a continuous section where the electrically powered travelling is possible up to the charge-possible point, based on the history through state of a charge management plan preparation processing. The changing over between the hydrid powered and the electrically powered travelling is done according to this determination while travelling.

Involving the recorded history of the travelling conditions on the chosen route, as presented in DE 10 2008 017556, allows an increase of the accuracy of the expected range that is achievable with the remaining charge of the battery.

To overcome the drawback of the long regeneration or charging time, an exchange of the whole battery-package is a known solution, wherein the battery packages are charged at dedicated reconditioning locations for regeneration, similar to today's filling stations. The publication WO 2009/039454 discloses an electric vehicle network comprising such battery exchange stations.

The vehicles will in this case drop off the whole battery package at the reconditioning station and replace it with another, most likely, but not necessarily, one with a higher energy content than the previous one. The dropped off battery will be recharged at the location and then be put to another vehicle's disposal. The stopover time can thereby be reduced to the time needed for the replacement of the battery, which can, in fact, be even shorter than the time needed to fuel a state of the art car.

It is also a known concept to recondition the storage by an exchange of only some parts of the battery like some electrolytes or electrodes, which are then regenerated (or charged) at reconditioning stations instead of an exchange of the whole battery package. Thereby the longish charging can be done at those stations and the time needed for reconditioning is reduced to e.g. pumping out the used, liquid electrolyte and pumping in the reconditioned one, whereby times similar to those of petrol fuelling stops can be achieved.

Beside those dedicated public stations, also regeneration by sockets at public or private parking lots is possible, since electricity can be easily supplied without much effort by the often already present electrical networks.

But still, especially in case of longer distances, where the energy contained in one fully charged battery is not sufficient to reach the desired target, dedicated charge or exchange stations have to be considered in the planning of the best route or path of travel.

The stock of fully or partially charged batteries at such a station can only be limited and a single location can easily run out of charged batteries, while other batteries are lying around, unused for quite a while, at some other locations.

Therefore, a management of the usage of those regenerative storages and also of the availability of reconditioning stations and the stock and regeneration of the exchangeable storages is one of the challenges to overcome when the introduction of a wide-spread system for electrical transportation means for private, public and/or business use should be achieved.

The resources of storages are a limited set, which entities can be associated to transportation means or reconditioning stations. Although in a global view their number is sufficient to power the complete set of vehicles presently on the road, there can likely be a shortage of storages or a queue for regeneration slots (storages and regeneration slots are further also referred to as resources) in one area, while in another area there is a huge stock of storages or lots of unused regeneration slots.

This results in a demand to manage the assignment or allocation of the energy cells to optimize their usage and avoid shortages. This can also be expressed as management of the assignment of transportation means to reconditioning stations, since the batteries or energy cells can in general either be seen as associated to a transportation means or a reconditioning station, where they are consumed, charged or stocked.

SUMMARY

It is therefore an object of the present invention to optimize the usage of a limited plurality of batteries and reconditioning resources, especially in a global view of a plurality of transportation means on their way within a certain region.

A particular object of the invention is to provide an optimisation, comprising actual, at least partially online, information about a plurality of eligible resources.

A further object of the invention is to improve the battery management for electrically powered vehicles comprising the guidance of the vehicles and to achieve a more accurate forecast of consumption and remaining range of the transportation means with the residual charge of the battery.

An aspect of the underlying problem can be described as a problem of assignment of a limited set of resources (batteries, reconditioning slots) to a limited set of consumers (transportation means) based on environmentally dependent driving behaviour (e.g. availability of resources and conditions thereof) which can also vary over time.

Those environmentally dependent conditions can to a certain extent be stated as predefined and calculable, while others are recursively dependent on each other, some of them are only partly predictable by an incorporation of some additional information but there are also some constraints that have to be stated as random in their occurrences so that they can, if at all possible, only be numerically accessible by statistical means.

A closed numerical solution of the assignment problem is therefore only possible for a limited number of problems with simple scenarios and hence some optimisation approach, most likely including some recursive re-calculation, has to be applied to "solve" the overall problem, whereby "solve" does not necessarily stand for finding the one and only best solution, but rather will be a trade-off between calculation effort, available information and actually desired overall accuracy of the result, also known as suboptimal or near-optimal result. The mathematical problem therefore can be described as a kind of constraint satisfaction problem.

The influencing parameters of the mentioned conditions and their consequences will herein be described in detail by way of examples, whereby a plurality of combinations of those conditions and also further parameters, in particular dependent on their impact in a concrete given case, can be included in the actual optimisation process. For example, an assignment-solution for one entity of transportation means to an entity of energy cell at an entity of reconditioning station will influence the availability of energy cells and reconditioning stations for the rest of the set of transportation means which has to be taken into account in further calculations.

For the optimisation, certain conditions and aspects of the influencing parameters can be comprised by a usage of abstracted mathematical models of the underlying physical or logical background, which can be comprised in lookup tables, statistical, historical or forecasted data. Those models can be overall, global models of the behaviour of the whole set of resources as well as models for subsystems such as e.g. a single battery or engine of a transportation means. For the modeling, a plurality of methods are known to a skilled person, as e.g. physical models, differential equations, Fuzzy-Logic models, logical models, statistics models, forecasting models, etc.

In an actual implementation, a balance has to be found between the number of parameters involved, the modeled dependencies between those parameters, the increase of complexity of calculation, and the increase of accuracy gained, whereby the inclusion of more information does in general not necessarily have to result in a correlative increase of the overall performance of the method.

The process of optimisation does not have to be done globally—in the view of the whole world—although such might also be possible under serious calculation effort. Actually an approach which considers the resources being approximately within a range being about the size of the range of mobility of the transportation means, or maybe twice, which should in general be sufficient to achieve decent results. Therefore, the word "global" as used in this text should be interpreted as such and in contrast thereto the term "local" will be used to characterize the view of a small group or even single transportation means, battery or reconditioning station, preferably of those entities which are likely to interact with each other.

The so defined global or local approach will result in the fact that some resources can dynamically drop in or out of the considered global or local zone by reaching the border of such a zone, whereby some kind of handshaking between the zones will have to be considered. This leads to a dynamic variation of not only the values, but also the numbers of constraints according to the vehicles on the way.

The dropping in or out can also occur when a resource is taken in or out of service, e.g. by parking, repairs, duty, demanded stopovers, overnight stays, holidays, etc. so the number of resources to consider in the optimisation can be reduced to the actual active ones. Nevertheless, data about means currently out of service can also be valuable for predicting forecasts, which can be included in the planning of the assignment.

Mathematically, an assignment problem has to be solved, in which a limited quantity has to be dynamically mapped to another quantity by taking into account variable environmentally dependent behaviour. As the environment is partly recursively dependent on the assignment and it can further vary dynamically in number and value, an optimisation process is needed, which is trying to find an optimized assignment by, probably recursively, optimizing the found solution by following a strategy that directs the results towards an, at least locally, optimal solution.

The parameters to be optimized, which are used to characterize the optimized solution, are in general a plurality of such parameters which will be combined in a desired way e.g. by an appropriate cost function.

The possibility of dynamic changes of auxiliary conditions also has to be taken into account when designing an appropriate algorithm which will most likely be implemented as a computer program product for the execution of the herein described methods, in particular those of the independent and dependent claims, by a digital processor, and which will be stored in some memory means.

The optimisation can be done by an application of a search algorithm, particularly based on the principle of incomplete search, which comprises heuristics that try to exploit partial knowledge about structure of the mathematical space, such as linear relaxation, constraint generation, and constraint propagation and the described models. This category includes a great variety of general metaheuristic methods, such as simulated annealing, tabu search, A-teams, and genetic programming, which can be used for combining arbitrary heuristics in specific ways. A complete and exhaustive enumeration is theoretically possible but in practice a rise of complexity of the problem will increase the calculation effort in such a way that the solution will not allow to find a solution within reasonable time, in particular not to provide solutions in real time or online.

There are also promising search methods designed for (currently non-existent) quantum computers, like Grover's algorithm, that are theoretically faster than linear or brute-force search even without the help of data structures or heuristics.

As the optimisation includes geographically distributed locations which are connected by discrete pathways for the transportation means, also the art of graph theory can be incorporated in the optimisation, wherein the positions can be represented as vertices and the pathways as edges. The basic approach used will be similar to the problem of state of the art navigation systems but the weighting of the edges and vertices of the graph and even the availability of the vertices is dependent on other auxiliary conditions than those simple ones from prior art wherein only the shortest time of travel from A to B has to be found. This makes a comparison of the simple, two-dimensional route planning as known from prior art to the herein presented method for assigning is not feasible, although the present method can also comprise some basics of such an approach, but in a much more sophisticated form.

The term combinatorial search is often used for algorithms that look for a specific sub-structure of a given discrete structure, such as a graph, a string, a finite group, and so on. The term combinatorial optimization is typically used when the goal is to find a sub-structure with a maximum (or minimum) value of some parameter. Since the sub-structure is usually represented in the computer by a set of integer variables with constraints, these problems can be viewed as special cases of constraint satisfaction or discrete optimization; but they are usually formulated and solved in a more abstract setting where the internal representation is not explicitly mentioned.

To be able to achieve a decent forecast of the remaining range available with the remaining charge of the battery, some additional information is helpful.

First of all, information about the condition of the battery has to be known. The most important factor therein is the remaining amount of consumable electrical energy stored in the battery, e.g. measured in kWh. Other factors such as full capacity, elapsed regeneration cycles, operating hours, maintenance schedule, temperature, age, manufacturer, type, model, maximum and optimal supply and charge currents, optimal charge profile, expected charging time to full capacity, a weighted age or an overall health of the battery which is dependent on its usage history, can be comprised in such condition information of the storage as they directly or indirectly influence the amount of energy available. The content of electrical energy or charge in such a storage can be evaluated e.g. by the known methods of measurement of the cell-voltage or cell-current, the impedance of the cell or other physical values. But also a measurement of the in and outflow of energy can be used to determine the present energy content.

By involving at least one of them, the accuracy of the forecast can be improved. For example, the remaining available capacity or the allowable peak current can strongly depend on the temperature or usage history of the battery. In advanced embodiments for example even the heating of the battery can be predicted dependent on an estimated forecast of current consumption, whereof not only a variation of available capacity but also a possibly resulting restriction of further current limits dependent on the expected rise in the temperature of the battery can be taken into account in the management of the battery.

Secondly, a consumption prediction of the vehicle is required to estimate the available range of the vehicle, achievable by the available amount of energy. In the simplest form this can be expressed as an average energy consumption per distance, but more accurate results can be achieved by taking into account at least one of the following sets of information.

As e.g. solar cells are also allowing a regeneration during driving or stopovers, this can also be taken into account when determining the expected range by incorporation of actual data of energy supplied from such a source and/or by a forecast of such, which can e.g. consider weather forecasts and the resulting expectable sunshine.

A three dimensional terrain model enables to not only take into account the distance to be travelled, but also an altitude profile of the track and the thereof influenced consumption or charge of battery during travel, which allows a more accurate prediction of consumption on the selected path of travel.

Also, the type of road, potential stop and go or overland zones, speed profiles, weather conditions, traffic information as well as traffic guidance information, such as already distributed over radio-signals or mobile internet, in particular containing information about obstructions, roadwork, traffic jams, accidents or the like, can be comprised in such an evaluation. Systems and protocols therefore are e.g. the ones developed by TPEG, known e.g. as TMC or TIS which are broadcasted over the RDS channels of radio stations, but also lots of internet based services are known which are usable for the same purpose.

Further also expected holiday or season conditions on the road as well as rush hours or planned or required stopovers can be valuable information which can be comprised in a forecast of consumption. Such a forecast of consumption based on similar, event based occurrences is, for example, daily routine in electrical supply network administration, wherein the management of network consumption versus production of electricity has to be forecasted quite accurately each day to buy or sell the correct amount of energy resources on the international electricity market as required the next day.

Also the characteristics of the vehicle itself have influence on the energy consumption. Such characteristics can range from a simple numerical factor representing the characteristic kWh/km, over a speed and/or load dependent characteristic, to a plurality of information such as type of vehicle, weight and load conditions, aerodynamic resistance, top speed, most efficient speed, characteristic energy consumption on different types of roads, which can for example also be determined according to analyses of recorded history data. The energy consumption can also be classified per road or path segment. Thereby a desirable optimum-speed on a road segment can be determined according to the actual position and road segment the vehicle is travelling, for example to optimize the energy consumption of the vehicle, to enhance the road usage, for traffic guidance, according to road conditions, to enhance service life of the top-surface and/or according to the gradients of the road segments.

If the batteries are exchangeable, also the types of batteries usable by the vehicle have to be known, as possibly batteries, differing in size, voltage, capacity, power-characteristics or the like can be available.

But also the consumption of further devices in the vehicle which are supplied by the battery, such as heating, cooling, entertainment equipment like radio or DVD-players, headlights, windscreen wipers, breaks, the management system itself, communication equipment, etc. should be taken into account to complete the prediction of consumption. Some of them can as well be predicted according to e.g. the local time of travel, weather conditions, ambient light or temperature conditions which can either be determined by sensors at the vehicle or taken from e.g. the weather forecast received by radio waves.

Beside the characteristics of the vehicle, also the ones of the actual driver can have enormous impact on the consumption per mileage. Those can range from a simple classification like "race driver", "normal driver", "cruiser" or "sunday driver" to a more sophisticated approach by modeling the driver's characteristics based on known historical data, in particular on the same vehicle or route or at least the same type of vehicle or route. To make use of such information, the driver has to be identified by some means such as e.g. a special code of his keys, his fingerprint, voice recognition, RFID, entering information on an input device, or others, which information can for example also be used for adjusting the seat position and mirrors to suit the driver's needs.

Further, information about planned or expected stopovers and durations of stopovers as well as further planned destinations and destinations to continue on afterwards are valuable information, since those can help to forecast the consumption of battery power with less uncertainty. For example such information about stopover durations and further targets allows to determine whether a recharge during a stopover is sufficient for storing enough energy to reach the further planned target, or if for example an exchange of the battery, even before reach of the intermediate stopover location would be the overall better option, whereby since a charging at the intermediate stopover is possible, also a replacement by a not fully charged battery would do, since the rest of the charge to full capacity can be done during the stopover.

Restriction of the driving times for drives, in particular as applied by governmental restrictions for commercial vehicles, busses, long-distance traffic, can also be an issue which can be factored into the evaluation of a desirable stopover station where the energy cells will be regenerated.

The driver does not necessarily have to be human, but can also be an electronic vehicle guidance system which, at least partially, steers the transportation means from one location to another. Although such systems are at the moment in a quite early development stage, they will probably be available to the public in near future, at least for simple tasks such as overland highway travel. In such automated driving systems, even more enhancements could be gained by the herein disclosed methods, as e.g. an automatic adaptation of driving characteristics for the achievement of a desired range of movement which allows reaching a certain station can be implemented.

In advanced embodiments also the time of day for charging can be incorporated in the planning process, since the price of electricity is highly dependent on the availability which can highly fluctuate in the course of time. The incorporation of so called "Smart-Grid-Charging-Infrastructures" can bring further benefits in the forecast of desirable recharging schedules by taking into account the availability and/or price of electricity.

The above described conditions, or at least a subset of those, will help to determine an accurate forecast of the remaining range of the vehicle.

Based on this consumption forecast and the condition information of the battery, planning the required reconditioning stopovers where the batteries are exchanged or regenerated can be done on a quite accurately predicted basis.

In particular since some of the above mentioned characteristics are dependent on each other or on the chosen route, an overall optimisation also including the choice of route can be done, e.g. in cooperation with a state of the art car navigation system. The criteria therefore can for example be the shortest time to travel, shortest distance to travel, lowest energy consumption, nicest view, sightseeing spots, avoiding of toll charges or parking fees, optimized connections to public transportation means, optimized round-trip time by inclusion of a plurality of destinations, possible activities during stopovers like coffee breaks, meals, golf courses, swimming pools, hotels, or others. It is also possible to work out the most relevant alternatives and provide those as options for the driver to choose from. In particular the mentioned identification of the driver or analysing the choices from a history of the same or similar trips enables the system to tune the presented alternatives according to the preferences of the driver or even automatically choose the drivers preferred route if the driver and his preferences are known as for example the daily route to and from work.

As the resources for charge or exchange of the storages are a limited factor herein, further advantages can be gained by not only involving the single vehicle and battery into the optimisation process, but by considering a plurality of such, in particular the ones within an intractable range. By doing so an overall—here also called "global", although geographically restricted to areas certainly smaller than the whole world—further optimisation of the management of the resources and their usage can be achieved. Thereby it is possible to distribute the limited resources across the transportation means in an optimized way.

Either this can be done by a centralized, dedicated management means or a group of such means or by individually distributed means at each of the vehicles or the batteries. What is needed therefore is some kind of computation means and a communication link in-between the vehicles, reconditioning stations and/or the management means that allows the exchange of actual information, either directly or indirectly e.g. by a connection to a communication network like the internet or its successors. Also cloud computing can be used as computation means, i.e. computational resources can be provided on demand via a communication network.

This does not mean—although this is would be a preferable variant—that the vehicles have to be online all the time during travel. An information update e.g. at the reconditioning stations can also be sufficient. Means for establishing the communication line are, due to the mobility of the vehicles, preferably wireless communication means, such as the known WPAN, WLAN, WMAN, WWAN, GSM, GPRS, UMTS, HSDPA, NGMN, Iridium OpenPort, WIMAX, Bluetooth, Zigbee or other similar means. Also, a communication over the powerline which is used for charging is possible.

To execute the herein presented method, some information about the actual positions of the resources (batteries, vehicles and reconditioning locations) are also desirable. Those can e.g. be defined by global position data from a GPS, GLONAS, GALILEO or other system, capable of providing position information, which can be received by means associated either directly to the battery or to the transportation means.

Based on the position data, the conditions of the batteries and the forecasts of consumption, in particular in combination with positions and characteristics of the reconditioning locations, allow an optimisation of the distribution of the resources that can be managed by an application of an optimisation algorithm on the overall problem.

By characteristics of the reconditioning locations, information on things like charging capacity, capability, number of charging slots, stock and condition of batteries in stock, availability of the battery-stock and the charging-slots, scheduled reservations or fixed bookings of the batteries on stock or changing-slots and others, can be obtained. Also the price for regeneration can be of importance and included in the decision e.g. whether to choose a close but pricey or a remoter but also cheaper location.

A problem thereby is to find a decent assignment of the available resources, while still gratifying auxiliary conditions, at least to a certain range.

The optimisation can be done by some search algorithms such as known from the arts of combinatory, graph-theory, genetic algorithms, Tabu-Search, Simulated Annealing, or others. Criteria for optimisation can be e.g. the time of travel for each vehicle, the overall energy consumption, the distribution of batteries as desired according to a forecast of further needs, a load balancing over the plurality of reconditioning locations, a load balancing on the roads, an optimisation of vehicle delays due to charging times, avoidance of traffic jams at rush-hours, or any combination of such.

The relevant optimisation criteria can be weighted and combined by application of a cost function which helps to optimize against multiple demands. For example the optimisation could be directed to consider minimizing the individual travelling times of the entities of transportation means to 50% but also to reducing the overall energy consumption of the whole set of transportation means to 25% by still fulfilling the stopover demands of the drivers to a certain range which seems acceptable at 25%.

In particular when closing in to a desired reconditioning location, a narrowing of the solution space of the optimisation will occur, whereby for example in a first step a preliminary reservation of an available stock or regeneration slot can be executed, and/or in a second step a fixed booking of the desired resources can be executed to ensure the availability at the time the desired location is reached, and also inform management means(s) of the reduced resources at the desired location, which has to be concerned in the further optimisations. Thereby an avoidance of resources conflicts or "jumping around" of the selected stopover location can be avoided and also the optimisation process does not need to re-evaluate those fixed solutions any more.

The means for managing the battery in the vehicle can also fulfill other additional purposes such as e.g. auto speed limit, distance control, management of the motors and/or comfort functions, etc.

The method according to the invention for guiding a mobile transportation means of a set of transportation means, to a selected reconditioning station of a set of reconditioning stations which transportation means have each associated a powering battery of a set of batteries, in a geographically distributed arrangement of the transportation means and the reconditioning stations, comprises at least the following steps:

The step of determining a position of the battery and/or the associated transportation means as a position datum by the usage of a position determination means, in particular wherein the position of the battery is determined either by the battery itself or by the position of the associated transportation means or by the position of the reconditioning station where the battery is currently on stock.

The steps of determining a condition of the battery, and forecasting a consumption prediction of the transportation means, for evaluating an achievable range of mobility of the transportation means according to its consumption prediction and the condition of its powering battery and the step of guiding the transportation means to the selected reconditioning station, which is located within the range of mobility of the transportation means along a path to a desired target and assigning the selected reconditioning station to the transportation means for charge or substitute of the powering battery.

Therein, the assignment of the selected reconditioning station is based on an environmentally dependent driving behaviour.

The environmentally dependent driving behaviour can be represented by a model and/or historical data, in particular with forecasting of the consumption characteristic according to an altitude profile of the path from a three-dimensional terrain information and/or characteristics of a driver of the transportation means.

The environmentally dependent driving behaviour can comprise further information from a plurality of entities of the sets of reconditioning stations, transportation means and/or batteries as part of the environment, in particular also information of their respective conditions.

The characteristics of a driver of the transportation means comprise the driving style of the driver of the vehicle, in particular determined from actual data or a history of the driving characteristics of the same driver.

The model of the environmentally dependent driving behaviour can optionally further comprise the actual and/or forecasted information of the stations, transportation means and/or batteries as well as the other environmental influences as mentioned in this document.

The invention also relates to a guidance unit and a computer program product for the execution of the method according to the invention.

BRIEF DESCRIPTION OF THE DRAWINGS

The method according to the invention and the devices and setup according to the invention are described or explained in more detail below, purely by way of example, with reference to working examples shown schematically in the drawings. Specifically.

FIG. 7 shows an illustration of the basic steps of an exemplary assignment according to the invention;

The diagrams of the figures should not be considered as being drawn to scale.

DETAILED DESCRIPTION

Figure 1:
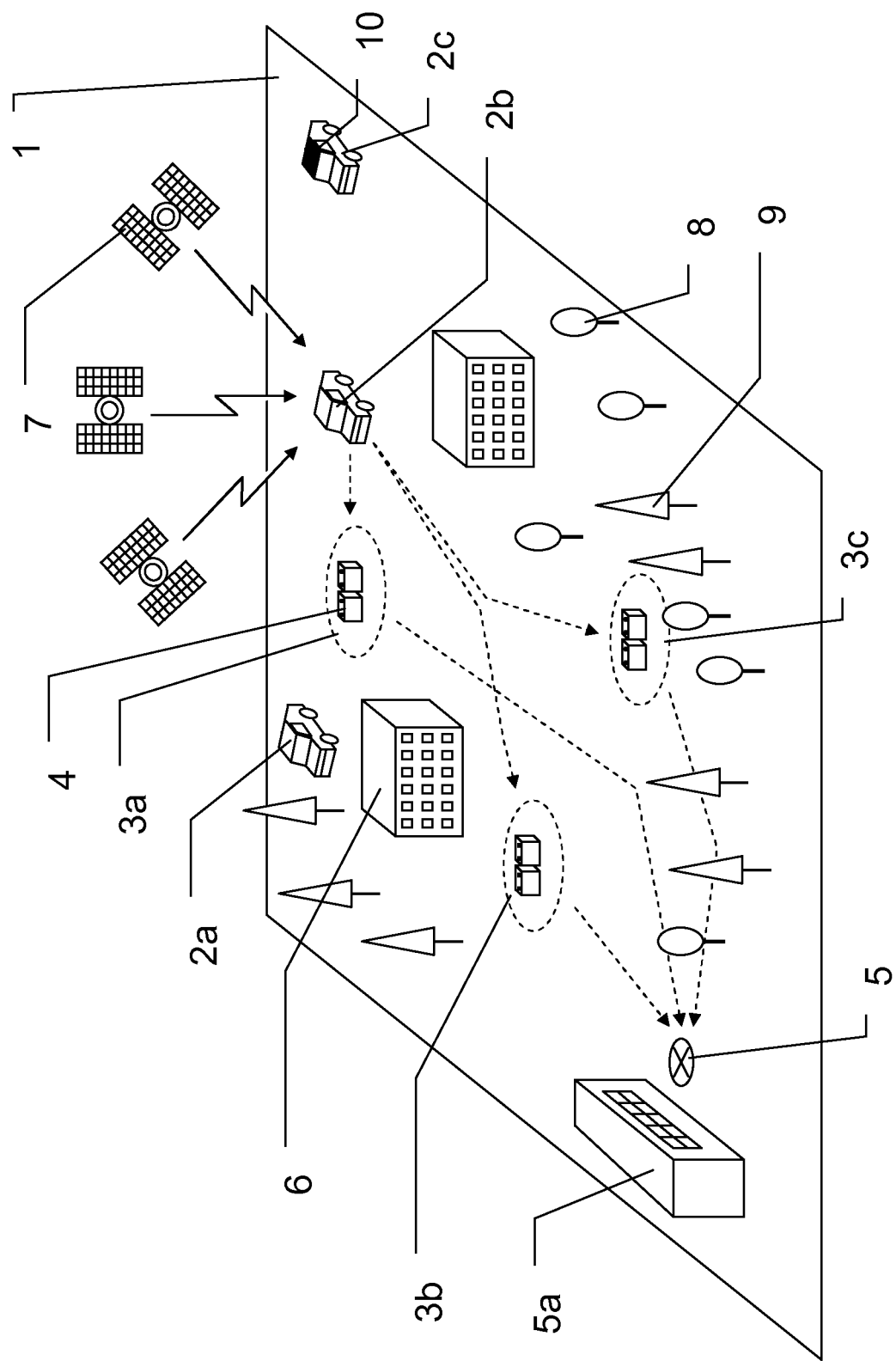
FIG. 1 shows an example of a possible geographical setup for explanation of the method according to the invention.

FIG. 1 illustrates a 3D view of an exemplary geographical setup of an area 1 wherein a set of transportation means 2a, 2b, 2c and a set of reconditioning stations 3a, 3b and 3c is shown. In this case, the transportation means 2 are illustrated by cars only although the method is not limited to this type of vehicle. The reconditioning stations 3a to 3c are illustrated by circles comprising a stock of two batteries 4, but in practice, the stocks will most certainly be different at different stations. At such a station 3, it is possible to substitute or replace a battery 4 which powerings the transportation means. The battery 4 can then be charged at the station 3 to be subsequently supplied to another transportation means 2. Some of those reconditioning stations 3 can also allow the charging of the battery 4 without substitution, by supplying charging energy to the transportation means 2 (or, more exact, to its assigned battery 4) for recharging, which can be done for example by a connecting cable or wireless by induction. Dependent on the type of energy cell 4, which does not need to be a battery or accumulator in a popular sense, but can also be some new concept of energy storage, the term "reconditioning" can also mean any other process, such as for example an exchange of electrolytes or electrodes, either solid or liquid ones.

The target 5 towards which the entity of transportation means 2b is heading is, in this special case, also a refreshing station, in particular a "charge-only" station where no stock of batteries for exchange is present. The destination 5 could for example be a parking slot at a shopping centre 5a which is equipped with an electrical socket where vehicle 2b can be plugged in for recharge, while the vehicle is parked and the driver is doing business.

Close to the reconditioning station 3b there is a restaurant 6 located, which can be visited by the driver for a lunch or coffee stopover during which the battery of his vehicle can be reconditioned, which means it can be exchanged or charged. Such a stopover can be one planned by the driver, allowing him to relax, consume food or drinks, as well as one demanded e.g. by governmental restrictions such as limited driving hours or times. Especially, if charging the vehicle's battery 4 takes quite a long time, also other leisure activities such as sightseeing, museums, swimming pools, amusement parks, golf courses, etc. as well as business opportunities like temporary offices, can be provided at the stopover location 6. Such additional opportunities can be included in the planning of the trip and the assignment of a certain entity of reconditioning station 3b out of the available set, dependent on needs and likes of the driver.

As illustrated for the transportation means 2b, but obviously not limited to this single entity of transportation means, a position determination means, as illustrated by the satellite navigation system 7, which can for example be a GPS, GLONAS, or GALILEO system, is comprised in either the vehicle 2 or its powering battery. Also, other possibilities such as GSM-Stations or movement tracking systems can be used to gather an actual position datum of the vehicle or battery. As the positions of reconditioning stations 3 are known (although there might be mobile reconditioning stations too) this allows an assigning of a certain entity of reconditioning station 3b or 3c to an entity of transportation means 2b, preferably close to a path to a desired target position 5, as exemplarily shown by the two paths which are indicated by the dashed lines.

Such a guidance means for guiding a transportation means 2b to a reconditioning station 3b can for example be similar to the state of the art navigation systems, where a driver can enter a desired target location to which he then will be guided along the shortest, quickest or cheapest path.

As the power contained in the battery of the vehicle is limited, some stopovers for reconditioning the battery might have to be included in the planning, if the energy of the battery is not sufficient to directly reach the desired destination 5. Especially for short stopovers at the destination 5, or when a reconditioning at the stopover location to a sufficient level is not possible, the inclusion of information about a continuation of travel—if known—can be planned in as well to avoid running out of energy later on, in an area where no reconditioning stations are within range or an indirection would have to be taken to reach a station. By the inclusion of planned going on, an exchange of the battery can be planned in along the path, even in advance of reaching the first target 5, although such would not be necessary for reaching the target 5. By this pre-exchange, a later target can then be reached after the stopover at the target 5 without having to take an indirection to a reconditioning station. The second target can be, as a simple example, the way home from the target 5, taking the same path as used to go there.

The transportation means 2c is also equipped with a solar panel 10, which allows a recharge of the energy cell by sunlight during travel or stopovers, dependent on the weather conditions. This can also be taken into account in the forecast of the consumption prediction, in particular in combination with a forecast of potential sunshine at its location.

Please also take notice of the trees 8 and 9 in the area 1 which will be less polluted by exhausts of the transportation means 2a to 2c since those are powered either fully or at least partially by electricity and managed by the method according to the invention.

Figure 2:
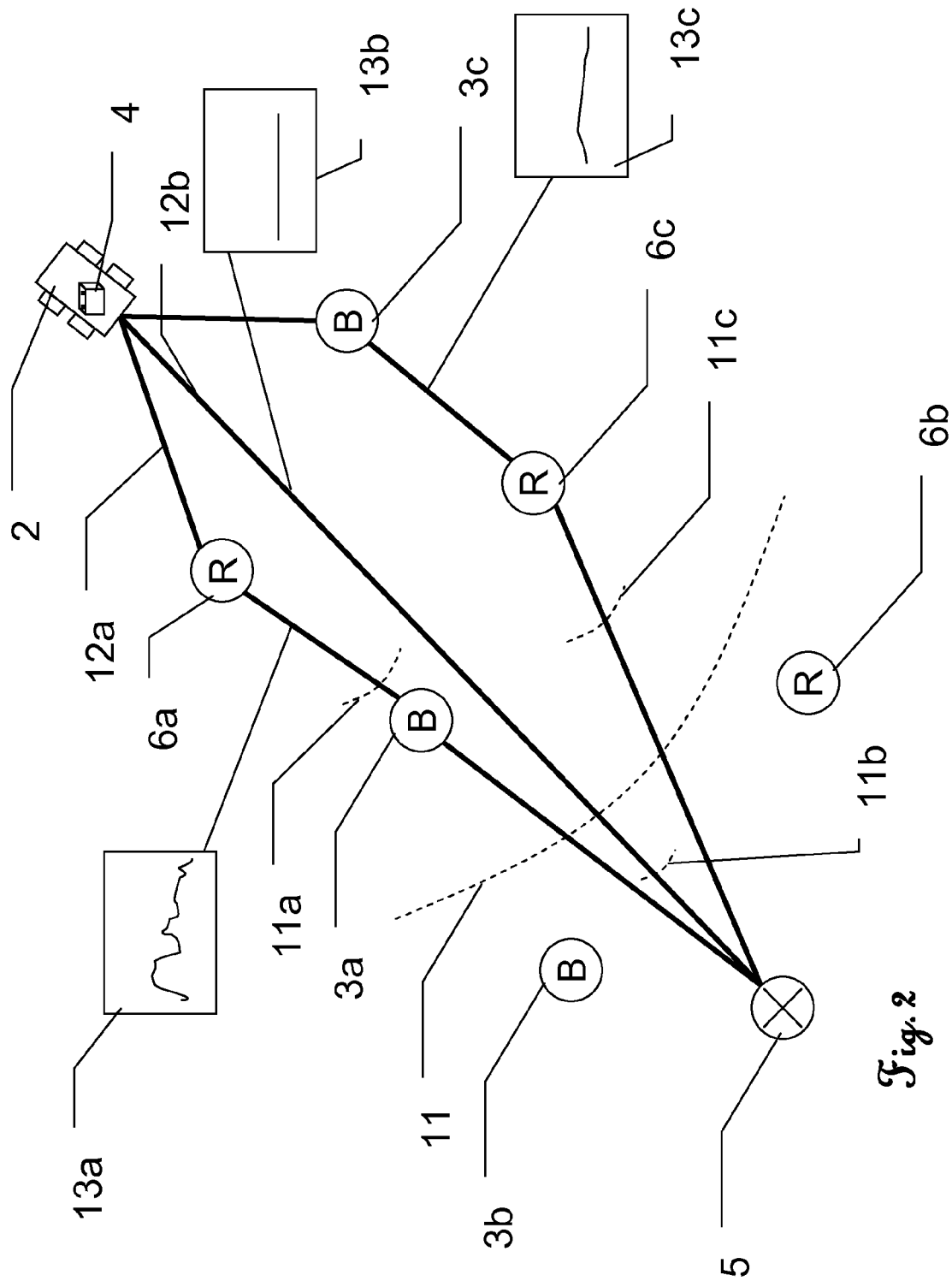
FIG. 2 shows an abstracted view of a setup wherein an evaluation of an achievable range under forecast of a consumption prediction comprising auxiliary conditions of terrain and environmental characteristics is done according to the method of the invention.

FIG. 2 shows an abstracted close-up view of one entity of transportation means 2 on the way to the target 5.

To select an assignment of a reconditioning station 3a, 3b, or 3c to the transportation means 2, an achievable range of the transportation means 2 has to be evaluated, which certainly has to involve a determination of the remaining power of the powering battery 4, as described above. The powering battery 4 is thereby not limited to a single unit but can also comprise multiple units which can be used parallel or sequentially. It is also an option to vary the number of units according to an actually desired range which means for example that for short travels less batteries will be on board of the vehicle than for long overland travels which for example can brings advantages due to weight reduction.

To evaluate the theoretically achievable range 11, further a prediction of the consumption of energy of the transportation means 2 needs to be forecasted or estimated as well.

According to the invention, such a forecast can comprise information about the environmental driving behaviour such as terrain, in particular the altitude profile 13a, 13b and 13c, of the path 12a, 12b or 12c which will be travelled and/or other additional environmentally dependent driving behaviours.

The terrain information allows a more accurate forecast of the consumption, as for example type or condition of the road on the selected path and in particular, the altitude profile of the path, has a direct influence on the power consumption. For example, a path over a steep pass on a mountain will require more energy than taking a path along a valley with less height differences or a flat highway through a tunnel. Therefore, the achievable range will vary dependent on the selected path as shown by the ranges 11a, 11b and 11c in context of the respective paths 12a, 12b and 12c.

The path 12b can not be taken, since the range 11b is not sufficient to reach the destination 5 with the amount of energy from the energy cell 4 associated to the transportation means 2. Therefore, a reconditioning of the power energy cell 4 by charge or exchange would be needed but apparently, no station 3 for doing so is available along the path 12b, so that this path can not be chosen.

In this example, the inclusion of the terrain information 13a and 13c results in the case of path 12a in a range 11a which is makes it impossible to reach the reconditioning station 3a.

A system according to prior art would fail in such a situation, since according to the theoretical, path-independent range 11 this would not have been foreseeable.

The environmental dependent driving behaviour can comprise the characteristics of the driver of the vehicle which can be human, but also non-human in a computer controlled vehicle or in case of an autonomous vehicle comprising an auto-pilot. Another example of a driver characteristic can be class of driver, his preferences and all the other things influencing the assignment as mentioned herein. For example the driving characteristics can be implemented as a mathematical model of a driver which is parameterized according to historical data recorded for the same driver, or also automatic detection according to the present behaviour of the driver or by input from the driver which helps to indicate the fact how "urgent" a travel is and if a higher energy consumption has to predicted due to the sportive driving style which will be used.

Such information to be comprised in the forecast can be modeled in different ways, for example based on the underlying physics of driving, but also on recorded historical data, a model whereof is generated and/or parameterized.

Figure 3:
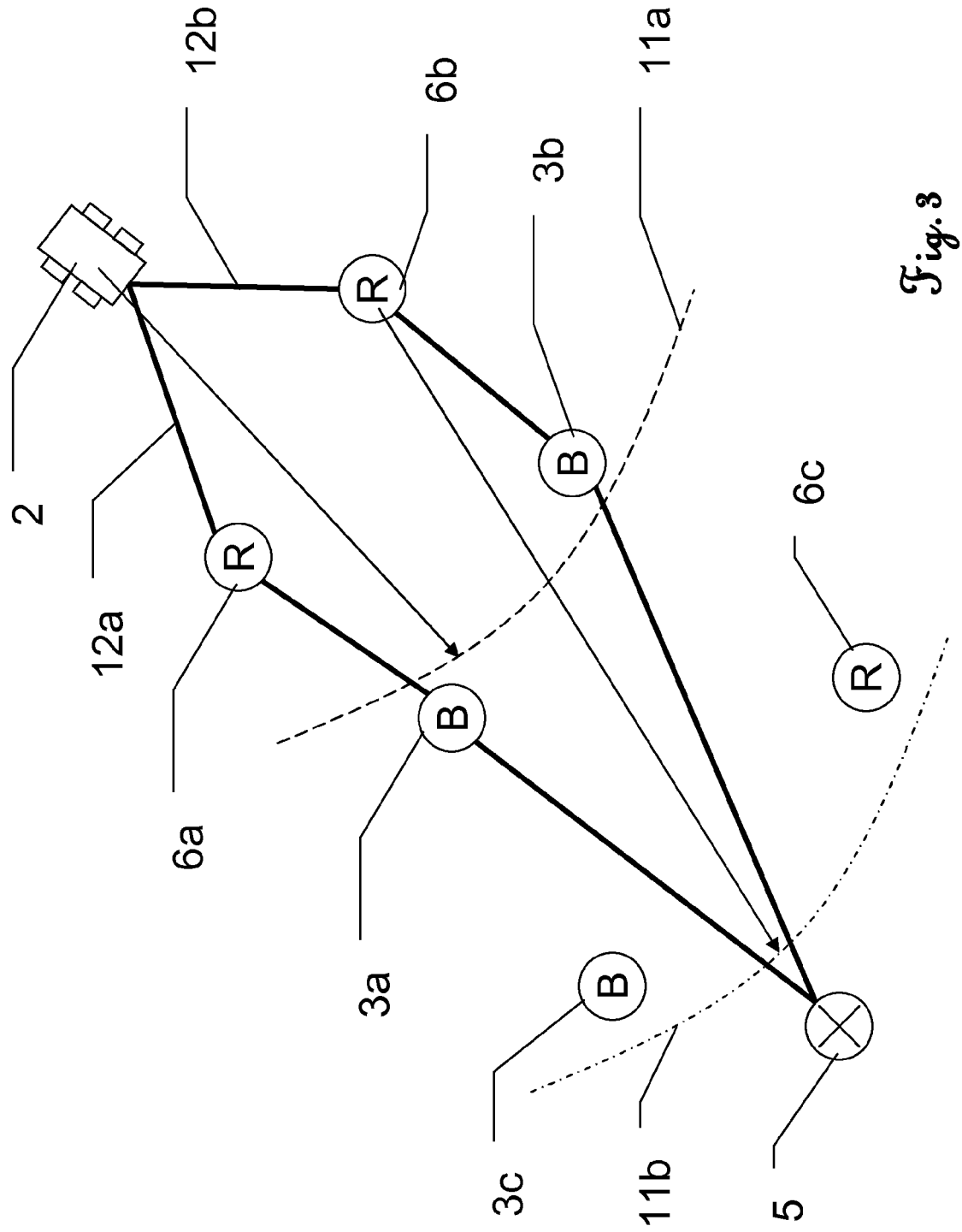
FIG. 3 shows a further example of another setup where the method according to the invention is executed.

FIG. 3 shows a single entity of transportation means 2 and a set of reconditioning stations 3a, 3b, 3c and stopover locations 6a, 6b, and 6c and connecting path 12a and 12b to a desired final station or location 5, which can be seen as one of the simplest embodiments according to the present invention. Apparently, practical implementations can be much more complex with much bigger sets. The assignment can be done completely offline, with the necessary data coming from some digital storage media, such as a DVD comprising geographical data like terrain information, connecting street networks and positions of reconditioning stations. The data can be comprised according to the invention to find possible solutions for the assignment of entities of reconditioning stations to the transportation means and guiding the transportation means on a path to the reconditioning stations 3, the stopover locations 6 toward the final destination 5, wherein the actual assignment will also influence the path.

In this example, the currently assigned battery will allow, according to its condition at the actual time and position, and according to the usage forecast, which comprises a terrain-dependent consumption prediction of the paths 12a and 12b, to achieve a range as marked by the line 11b. Since this range 11b allows only on one of the two possible paths to reach a reconditioning station 3, this path 12b is in this case the only one which can be taken. At the station 3b, located within the range 11b on the path 12b there will be—according to online information about the condition of the station 3b—only one battery available at the expected time of arrival, which will be reconditioned up to 70%.

With this 70% charged battery, the achievable range 11a will not be sufficient to reach the desired destination 5 from the station 3b, for which at least 80% of full capacity of the available type of battery would be needed. In this case, a solution would be to wait at the station 3b until the battery will be sufficiently charged, which can be expected, according to a forecast of the charging process, in about 42 minutes after the expected arrival at the station 3b. The driver has to wait at the station 3b until the battery has reached its 80% capacity or alternatively, the method according to the invention can suggest for example a coffee-stopover at the location 6b along the path 12b, to reduce or avoid waiting times at the station 3b. To ensure the availability of the desired battery at the station 3b at the time of arrival, the battery can be reserved online or booked according to the selected assignment at the station 3b where the transportation means will be guided.

Figure 4:
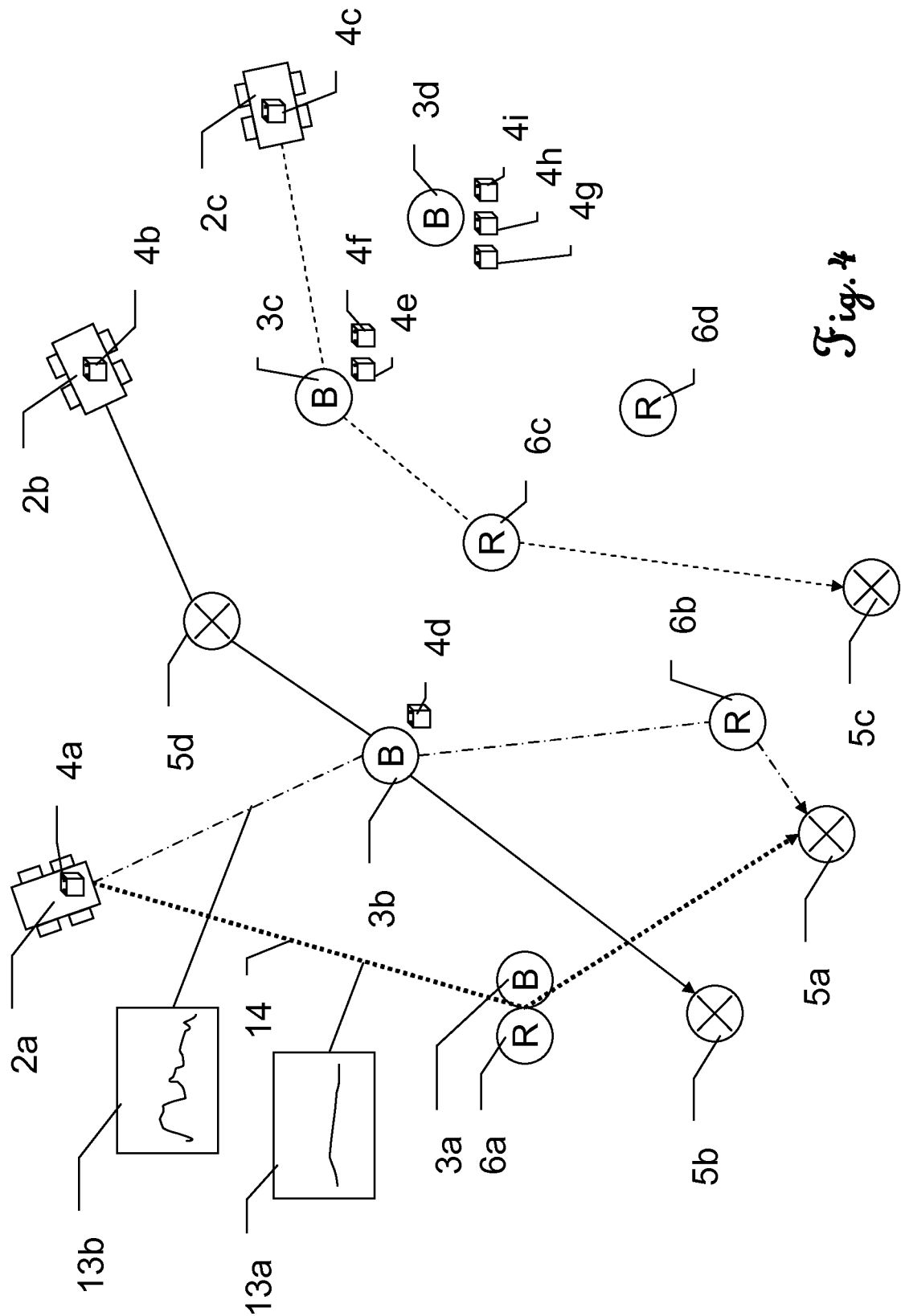
FIG. 4 shows an abstracted example to explain some aspects of the assignment of the sets by the method according to the invention.

FIG. 4 illustrates an exemplary assignment according to the invention in view of multiple transportation means 2, stations 3 and batteries 4 out of the respective sets, which are geographically distributed over an area. As noted above, it is one possible way for solving the assignment to consider the whole sets, but this is in general not mandatory, since it can be sufficient to consider only those subsets of entities, which can actually interact with each other due to their availabilities, positions, ranges and directions.

In this example, the considered set of transportation means consists of two cars 2a, 2c, whose drivers have each entered desired target location 5a, 5c into their guidance systems. There is also a third vehicle 2b in the set of transportation means that has to be considered, which is a mail van 2b on its planned daily route to the remote post offices 5d and 5b.

One of the plurality of possible solutions for assignment of the transportation means 2 to the set of available reconditioning stations 3a to 3d and under consideration of the available road-connections between them is shown by the lines from the transportation means 2 to their targets 5.

As it will be shown below, the presented solution has some drawbacks which can be overcome by the method according to the present invention.

Obviously, a shortage of batteries 4 exists at the station 3b as there is only one entity of battery 4d in stock, but there are two transportation means 2a and 2b which are assigned to the station 3b. In an unmanaged system, this would result in delay of one of the vehicles 2, since only one can exchange its battery 4 at the station 3b and the other one will have to wait until charging has finished, at least to such a capacity that allows a further travel to the destination or another station, where a sufficiently charged battery is available.

In the scenario comprising the method according to the invention, this can be avoided by an optimisation of the assignment and guidance. As an accurate prediction of energy consumption, dependent on the path of travel is achieved by taking into account environmentally dependent driving behaviour, in particular the terrain information 13a and 13b, which are forecasted by a model, a new, alternative solution can be found, which is marked by the dotted line 14. Due to the lower energy consumption on the new path 14 with the terrain 13a than on the path with terrain 13b, the station 3a will be in range of vehicle 2a. As the driver of 2a on his way to 5a has planned a meal stopover at the restaurant 6b anyway, his path can be optimized by taking the meal about half an hour earlier at the restaurant 6a, which is combined with the reconditioning station 3a. At the station 3a there will be, according to a current forecast, no battery 4 on stock at the estimated arrival time of the car 2a, but since the planned meal stop at 6a will last for about an hour, this time can be used to charge the battery 4a onboard of the vehicle 2a to a condition which allows to achieve the range needed to reach the final destination 5a. The overall travelling time of vehicle 2a will be about the same as in the first approach, but the guidance and assignment is optimized according to the invention.

This optimisation does also affect the vehicle 2b, as this can now be assigned to the battery 4d at the station 3b without conflict, allowing it a quick reconditioning stopover by exchange of the battery at the station 3b, which is desirable since the post van 2b has a fixed schedule for its trip, which comprises the stations 5d and 5b, wherein delays can have severe impact on the whole postal service in this area. Therefore, a certain priority can be assigned to this vehicle's demand over e.g. leisure travels, or shopping trips.

According to the invention in a more sophisticated embodiment, the assignment can also comprise information about the mentioned schedule of the trip of 2b whereby a forecast of demand of batteries at station 3b can be done each working day, when the post van 2b will be on its way, to ensure the quality of the postal service in this area. In one case, this can e.g. be done by a preliminary reservation of the reconditioning station 3b or in particular of an entity of the stock of batteries 4 at the station 3b.

Since a change of path for the transportation means 2b is not desirable, its path can also be fixed and a fixed booking of the reconditioning station 3b or in particular of a battery 4d which has sufficient remaining charge at the expected time of exchange, can be done for each working day.

Mathematically, the method according to the invention does assign the set of transportation means 2 {2a, 2b, 2c} to the set of reconditioning stations 3 {3a, 3b, 3c, 3d} for charging or exchanging the powering battery {4a, 4b, 4c} of the corresponding transportation means out of the set of batteries 4 {4a, 4b, 4c, 4d, 4e, 4f, 4g, 4h, 4i}.

In this assignment, supplementary conditions are comprised such as for example the possible paths between the mentioned sets, a model of terrain information 13a and 13b of the paths, a model of driver's characteristics, the conditions of the entities like charge level of the entities of battery 4, consumption index or model of the transportation means 2, reconditioning capabilities of the stations and/or the other influencing factors, especially, but not restricted to those factors and aspects explicitly mentioned in this application.

Based on those supplementary conditions, an optimisation of the assignment can be done with the goal of finding the best global solution. Such an optimisation can for example be targeted to an avoidance of resource conflicts, in particular a lack of charge or exchange facilities at the reconditioning stations 3, but also multiple aspects can be targeted in optimisation for example by weighting different aspects according to a cost function as already explained.

Examples for supplementary conditions which can be included in the assignment process according to a modeling of influencing parameters and their effects have already been shown. For example, the terrain or environmental information can be used to weight the edges of the graph between the vertices.

Figure 5:
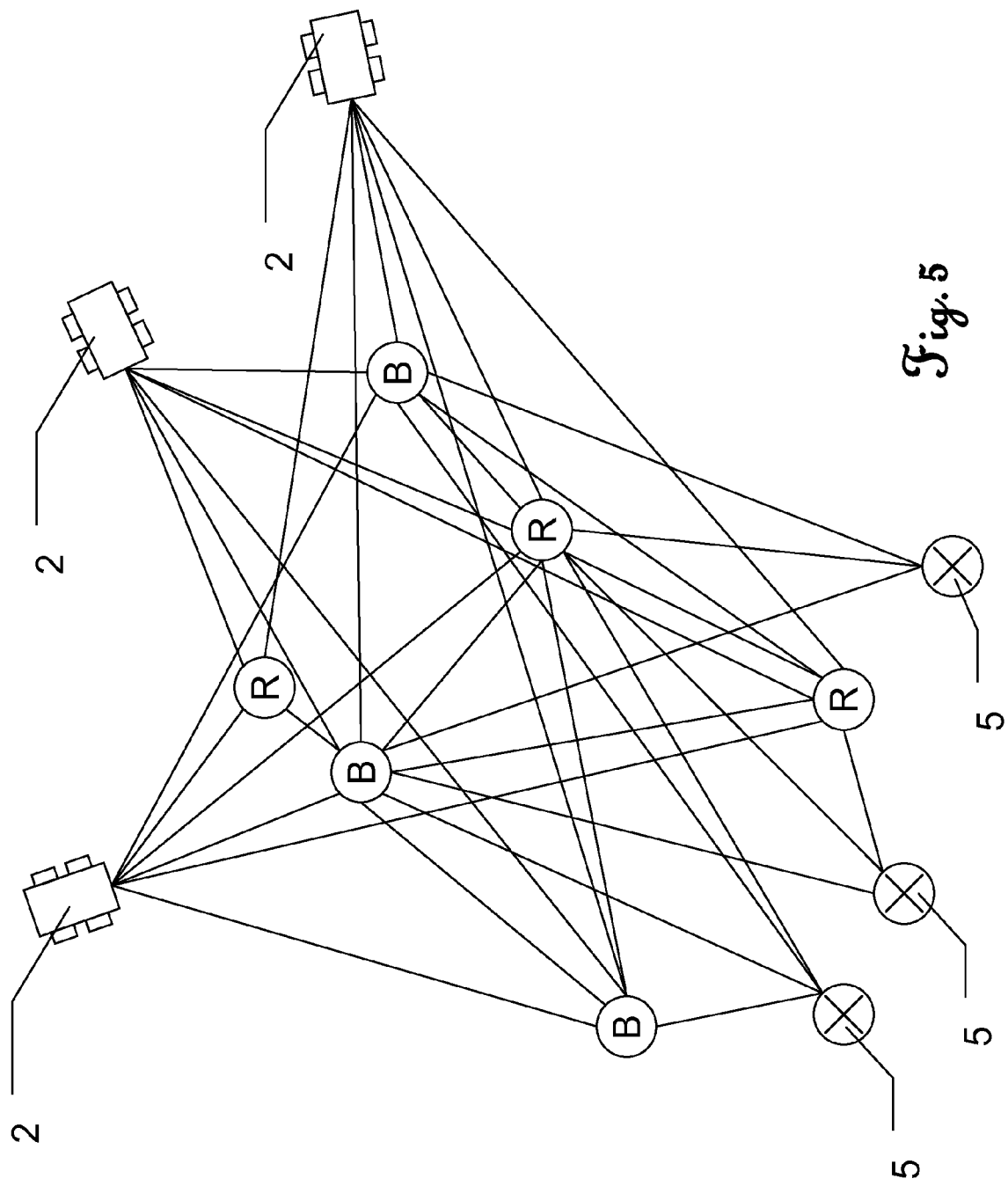
FIG. 5 shows all possible assignments in a simple setup of small sets of transportation means and reconditioning stations and stopover locations.

FIG. 5 exemplarily shows an almost complete solution space of assignment and guidance options for a small set of stations B and transportation means 2 which shows rapid increase of complexity in view of larger sets.

Although the method according to the invention brings advantages in view of single, offline transportation means, an embodiment which comprises information of a plurality of entities or a subset of the sets can further improve the performance of the method according to the invention. In particular, when an information exchange between the entities is established, only at certain times like during stopovers or online during most of the time of travel by some wireless communication means as discussed above the overall performance can be increased.

In a particular embodiment, the edges of the graph in FIG. 5, which are shown by solid lines, can be weighted dependent on a number of the side conditions, which can also be interdependent on each other, as already explained above.

The method according to the invention will determine the assignment of the resources by applying of a search algorithm as known in the art, to the graph for determining an optimized assignment whereby the transportation means can be guided to the reconditioning stations.

Figure 6:
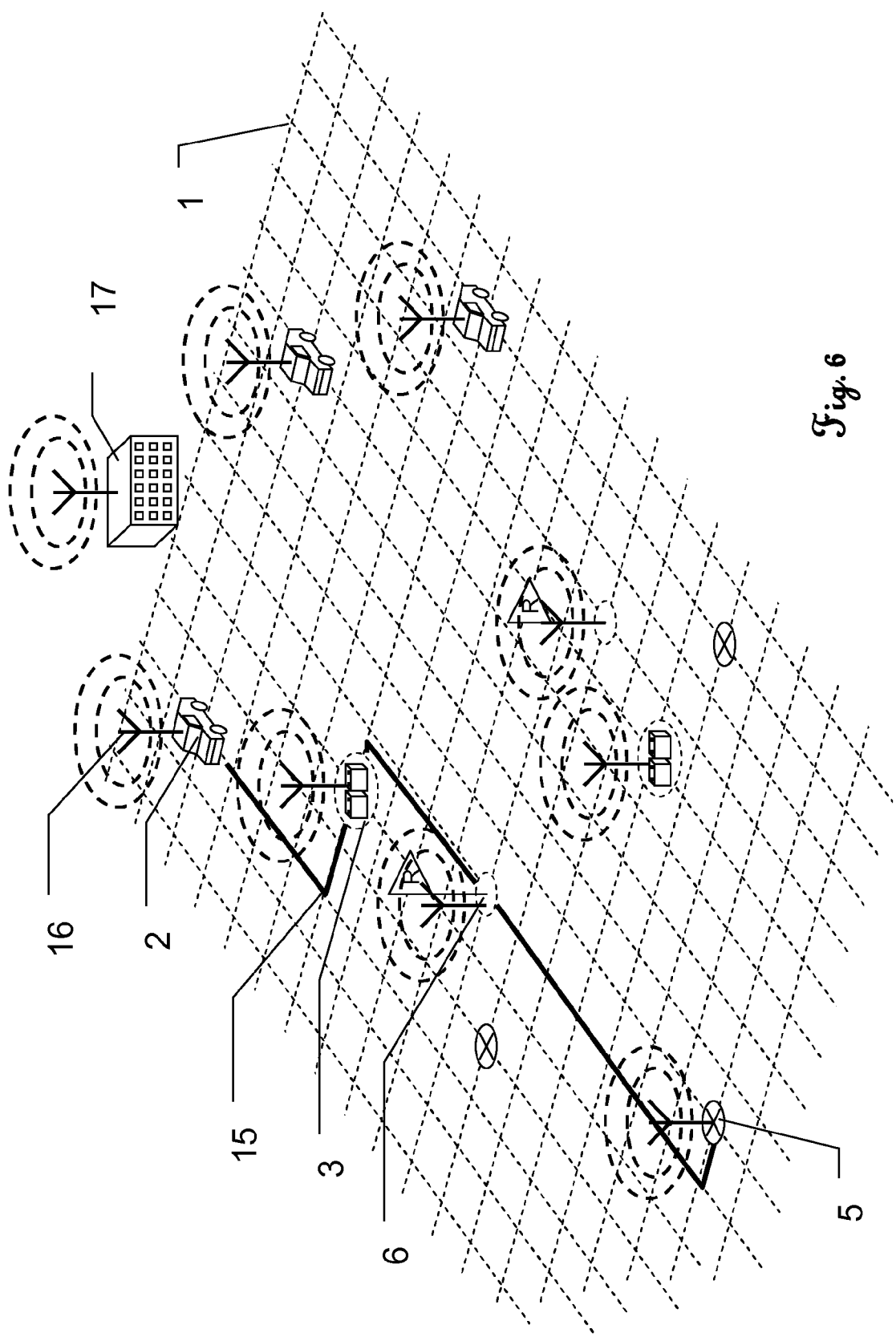
FIG. 6 shows a path of an entity of transportation means to a destination with a regeneration stopover and a coffee break along the path which is assigned by the method according to the invention.

FIG. 6 shows an exemplary setup were a path 15 of the transportation means 2 to a destination 5 is shown, along which a reconditioning station 3 is assigned to the transportation means 2, where its assigned battery can be exchanged. Further there is a coffee-stopover 6 assigned where the already exchanged battery of the transportation means 2 can further be connected to a recharging facility if necessary for reaching the destination 5 or follow up destinations. The information on which the assignment is based is in this embodiment transmitted over wireless communication means 16, illustrated by antennas at the transportation means and stations. The actual optimisation is done at the centralized assignment means 17 for the considered area 1 which can establish a communication link to the transportation means, stations and also to the internet for the reception of weather forecasts, traffic information, expectable demands due to special events, planned schedules and the other information already mentioned. This actual and forecasted information is used as auxiliary conditions or constraints in the assignment process, which is done by a cluster of servers at the assignment means 17. The grid shown in the area 1 can be used for determining the distances according to the Metric- or Manhattan-Method. The results of the assignment will be transmitted to the transportation means and station which will comprise the assignment in the local planning at the station 3 or guidance of the transportation means 2, for example in planning the path and stopovers and guiding or assisting the driver of the transportation means to follow the path along the assignments.

FIG. 7 exemplarily shows a simple illustration of an embodiment of the assignment, not from a geographical, but from a logical view, to explain some of the basic steps comprised therein.

An entity of the set of transportation means 2 which has an associated or currently assigned battery 4 is assigned to an entity of reconditioning station 3 out of a set of such stations. The stations can also have a stock of currently assigned batteries 4 which are either waiting for charging, are currently being charged or have already been charged and are stocked to be supplied to demanding transportation means. All the batteries 4 at the reconditioning stations 3 and the transportation means 2 make up the set of batteries.

The assignment 25 according to the invention will at least comprise information about the condition 22 of the battery and the consumption prediction 21 of the transportation means 2 along a desired path 20, whereof a range of motion 23 can be evaluated, which is currently achievable. Out of the information, regarding the range 23 and the path 20, as one special example, a pre selection of a subset of eligible stations 24 which are convenient for the transportation means can be involved, out of which subset selected assignment 25 can be made. This selected assignment comprises an optimisation of the assignment 25 on the basis of the environmentally dependent driving behaviour. A change of assignment 25 can also result in a change of the path 20, whereby a recursive re-calculation might occur during optimisation. As already explained, a plurality of other environmental restrictions and/or conditions 26 can also be comprised in the selection of the assignment 25 according to the invention.

In one embodiment, a method can include the search algorithm being based on the principles of: Heuristics; incomplete search; genetic algorithms; tabu search; simulated annealing; Greedy-Algorithm; Prim-Algorithm; and/or Kruskal-Algorithm.

In one embodiment, a method can include the condition of the battery comprising at least a subset of: actual capacity; full capacity; temperature; actual state of usage; estimated remaining power; estimated time to recharge to full capacity; age; date of production; elapsed operating hours; elapsed regeneration cycles; health or weighted age, according to a usage-history; required maintenance times; life expectancy; load history; desired recharging characteristics; max recharging power; desired supplying characteristics; max peak power; max continuous power; and/or manufacturer, type, model, serial number.

What is claimed is:

1. A method for guiding a mobile transportation means of a set of transportation means, to a selected reconditioning station of a set of reconditioning stations which transportation means have each associated a powering battery of a set of batteries, in a geographically distributed arrangement of the transportation means and the reconditioning stations, comprising the steps of:
    determining a position of the battery;
    determining a condition of the battery;
    forecasting a consumption characteristic of the transportation means;
    evaluating an achievable range of mobility for the transportation means according to its consumption characteristic and the condition of its powering battery;
    assigning the selected reconditioning station, out of the set of reconditioning stations, to the transportation means for charge or substitute of the powering battery, which is located within the range of mobility of the transportation means along a path to a desired target;
    guiding the transportation means to the selected reconditioning station, wherein:
        an optimization of the assignment or the path is executed by a search algorithm for assigning the set of transportation means to the set of reconditioning stations and batteries, based on actual or forecasted information about multiple entities of the sets of transportation means, stations and batteries as well as their conditions;
        the optimization being done on a cost function combining at least:
            a spatial distribution of the set of batteries over the reconditioning stations, and a forecast of desired stocks;
            a travelling time of transportation means;
            an overall energy consumption of one or multiple entities of the set of transportation means; and
        a priority of one or multiple entities of the set of transportation means,
        and wherein
        the assignment of the selected reconditioning station is based on an environmentally dependent driving behavior, and the environmentally dependent driving behavior is represented by a model or historical data with a forecasting of the consumption characteristic according to an altitude profile of the path or a section of the path from a three-dimensional terrain information and the characteristics of a driver of the transportation means,
        the condition of the battery comprises at least a subset of:
            temperature, and
            actual state of usage;
        the condition of the reconditioning station comprises at least actual or forecasted information about:
            a restriction of usage for public, private or certain other groups;
            a battery stock at the station;
            a booking or reservation information of the battery stock or the reconditioning capacity; and
            ambient temperature conditions are taken into account in a prediction of consumption.

2. A method according to claim 1, wherein the search algorithm is based on the principles of:
    Heuristics;
    incomplete search;
    genetic algorithms;
    tabu search;
    simulated annealing;
    Greedy-Algorithm;
    Prim-Algorithm; or
    Kruskal-Algorithm.

3. A method according to claim 1, wherein the optimization is executed in a centralized way, by a stationary dedicated means, or a group of such dedicated means, or decentralized in each battery or transportation means, or by cloud computing.

4. A method according to claim 1, wherein the optimization includes a narrowing of the solution space while progressing towards the selected reconditioning station or a stopover location for each transportation means, resulting in an optimized path of travel.

5. A method according to claim 1, wherein the path or a section of the path or assignment will be re-determined for the transportation means while travelling.

6. A method according to claim 1, wherein:
the path or a section of the path or assignment will be re-determined for the transportation means while travelling by involving a preliminary reservation of the assigned reconditioning station or an entity of battery stocked there, or
the path, section of the path or assignment will be fixed for the transportation means in advance of arrival at the reconditioning station by a fixed booking of the assigned reconditioning station or an entity of the set of batteries stocked there.

7. A method according to claim 1, wherein the selected reconditioning station is determined by further involving actual or forecasted information about:
a condition of the reconditioning stations of the respective set;
a condition and position of the at least one other battery out of the according set;
the path of the transportation means; or
a path and allocation of at least one other transportation means out of the according set.

8. A method according to claim 7, wherein the condition of the reconditioning station comprises at least actual or forecasted information about:
a reconditioning capacity of the station;
a usage of the reconditioning capacity;
a number of available slots for reconditioning;
a price for reconditioning of the battery; or
an information about leisure or business activities located around the station.

9. A method according to claim 1, wherein the actual information is exchanged by a communication network, either updated generally online while travelling or at least updated occasionally, in particular by a wireless communication means.

10. A method according to claim 1, wherein the actual information is exchanged by a communication network, either updated generally online while travelling or at least updated occasionally, by a wireless communication means.

11. A method according to claim 1, wherein the environmentally dependent driving behavior is represented by a model or historical data.

12. A method according to claim 1, wherein the path is determined according to:
the position of the transportation means;
the position of the desired target of the transportation means;
the position of the desired target of the transportation means according to a driver's input;
the positions of the reconditioning stations;
information on a planned continuation after the desired target has been reached;
information on planned or demanded stopovers of the transportation means and expected times for stopovers; or
information from traffic information or traffic guidance systems.

13. A method according to claim 1, wherein the condition of the battery comprises at least a subset of:
actual capacity;
full capacity;
estimated remaining power;
estimated time to recharge to full capacity;
age;
date of production;
elapsed operating hours;
elapsed regeneration cycles;
health or weighted age, according to a usage-history;
required maintenance times;
life expectancy;
load history;
desired recharging characteristics;
max recharging power;
desired supplying characteristics;
max peak power;
max continuous power; or
manufacturer, type, model, serial number.

14. A method according to claim 1, wherein the model used for the forecast of the consumption characteristic comprises at least a subset of:
the path or a section of the path of the transportation means, in particular comprising a stop and go zone, a road type and a road condition;
a consumption characteristic of the transportation means, in particular comprising a characteristic energy consumption of the transportation means, a class of transportation means, a weight or a load;
a drivers characteristic of an actual driver of the transportation means, either human or non-human;
an information history of other transportation means or drivers previously travelling the path;
a forecast of holiday, seasonal or rush-hour conditions to be expected on the path; or
an information from traffic information or traffic guidance systems.

15. A guidance unit comprising:
a localization unit for determination of a position datum;
a battery observation unit, for determination a condition of a battery;
a range evaluation unit for determination of an achievable range according to the condition of the battery and to a forecast of a consumption prediction of a transportation means associated to the battery; and
a guiding unit, in particular comprising an interface to a human user, for assigning an entity out of a set of reconditioning stations to the transportation means and providing information for guiding the transportation means to the entity of reconditioning station along a path to a target for the transportation means,
wherein the guidance unit is configured for guiding a mobile transportation means of a set of transportation means, to a selected reconditioning station of a set of reconditioning stations which transportation means have each associated a powering battery of a set of batteries, in a geographically distributed arrangement of the transportation means and the reconditioning stations, comprising the steps of:
determining a position of the battery;
determining a condition of the battery;

forecasting a consumption characteristic of the transportation means;

evaluating an achievable range of mobility for the transportation means according to its consumption characteristic and the condition of its powering battery;

assigning the selected reconditioning station, out of the set reconditioning stations, to the transportation means for charge or substitute of the powering battery, which is located within the range of mobility of the transportation means along a path to a desired target; and guiding the transportation means to the selected reconditioning station, wherein:

an optimization of the assignment or the path is executed by a search algorithm for assigning the set of transportation means to the set of reconditioning stations and batteries, based on actual or forecasted information about multiple entities of the sets transportation means, stations and batteries as well as their conditions;

the optimization is done on a cost function combining at least:

a spatial distribution of the set of batteries over the reconditioning stations, and a forecast of desired stocks;

a travelling time of transportation means; an overall energy consumption of one or multiple entities of the set of transportation means; and a priority of one or multiple entities of the set of transportation means; and the assignment of the selected reconditioning station is based on an environmentally dependent driving behavior, and the environmentally dependent driving behavior is represented by a model or historical data with a forecasting of the consumption characteristic according to an altitude profile of the path or a section of the path from a three-dimensional terrain information and the characteristics of a driver of the transportation means, the condition of the battery comprises at least a subset of: temperature, and actual state of usage; and the condition of the reconditioning station comprises at least actual or forecasted information about:

a restriction of usage for public, private or certain other groups;

a battery stock at the station;

a booking or reservation information of the battery stock or the recondition capacity; and ambient temperature conditions are taken into account in a prediction of consumption.

16. A tangible non-transitory computer program product comprising program code stored on a machine-readable storage medium, for carrying out:

a method for guiding a mobile transportation means of a set of transportation means, to a selected reconditioning station of a set of reconditioning stations which transportation means have each associated a powering battery of a set of batteries, in a geographically distributed arrangement of the transportation means and the reconditioning stations, comprising the steps of:

determining a position of the battery;

determining a condition of the battery;

forecasting a consumption characteristic of the transportation means;

evaluating an achievable range of mobility for the transportation means according to its consumption characteristic and the condition of its powering battery;

assigning the selected reconditioning station, out of the set of reconditioning stations, to the transportation means for charge or substitute of the powering battery, which is located within the range of mobility of the transportation means along a path to a desired target; and guiding the transportation means to the selected reconditioning station, wherein:

an optimization of the assignment or the path is executed by a search algorithm for assigning the set of transportation means to the set of reconditioning stations and batteries, based on actual or forecasted information about multiple entities of the sets of transportation means, stations and batteries as well as their conditions;

the optimization done on a cost function combining at least:

a spatial distribution of the set of batteries over the reconditioning stations, and a forecast of desired stocks;

a travelling time of transportation means;

an overall energy consumption of one or multiple entities of the set of transportation means; and a priority of one or multiple entities of the set of transportation means;

the assignment of the selected reconditioning station is based on an environmentally dependent driving behavior, and the environmentally dependent driving behavior is represented by a model or historical data with a forecasting of the consumption characteristic according to an altitude profile of the path or a section of the path from a three- dimensional terrain information and the characteristics of a driver of the transportation means;

the condition of the battery comprises at least a subset of:

temperature; and actual state of usage; and the condition of the reconditioning station comprises at least actual or forecasted information about:

a restriction of usage for public, private or certain other groups;

a battery stock at the station;

a booking or reservation information of the battery stock or the reconditioning capacity; and ambient temperature conditions are taken into account in a prediction of consumption.

\* \* \* \* \*